P. DONOFRIO.
DEPOSITOR.
APPLICATION FILED MAY 31, 1916.

1,216,665. Patented Feb. 20, 1917.
3 SHEETS—SHEET 1.

WITNESS
C. A. Brown

INVENTOR.
PATSY DONOFRIO
BY C. F. Blake
ATTORNEYS.

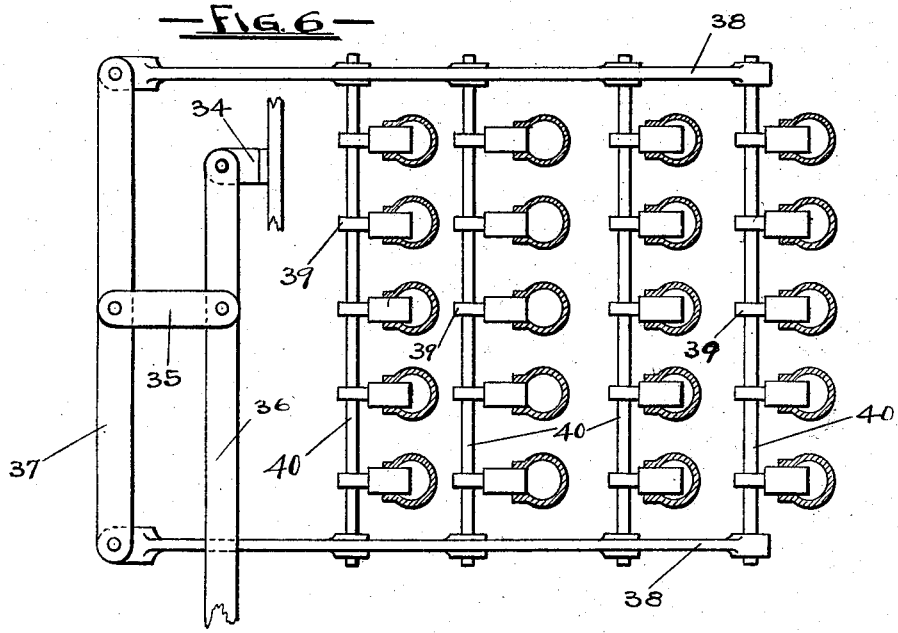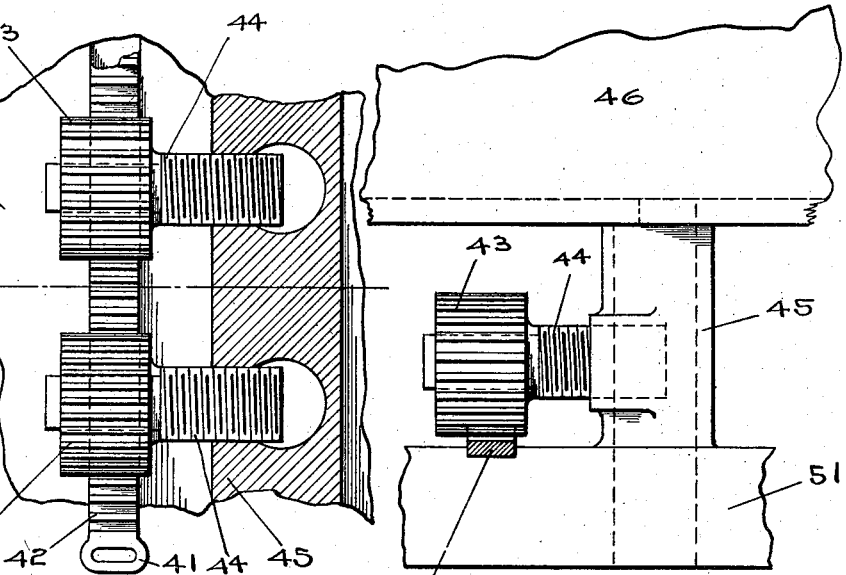

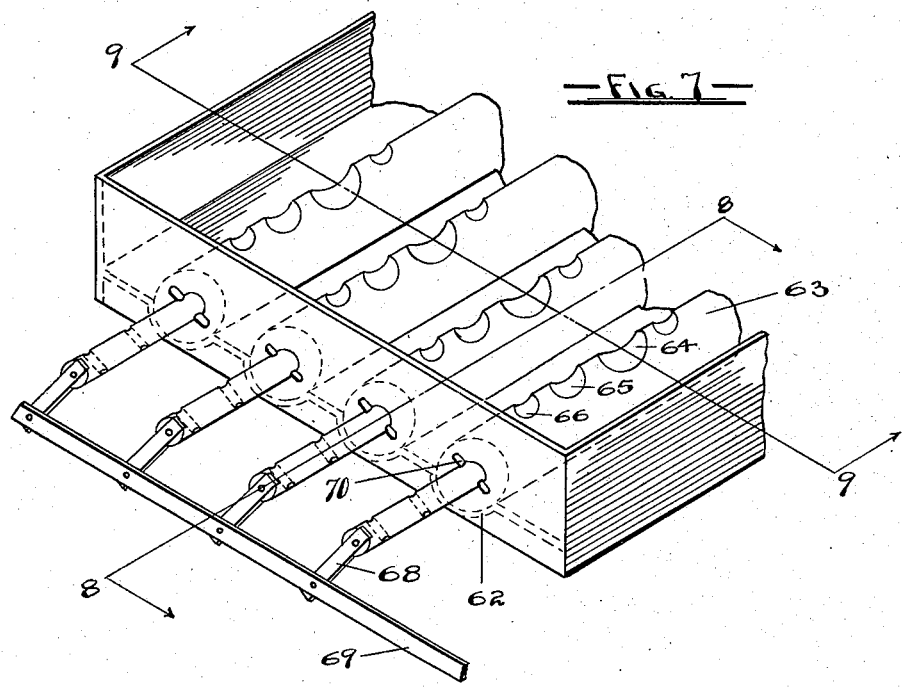
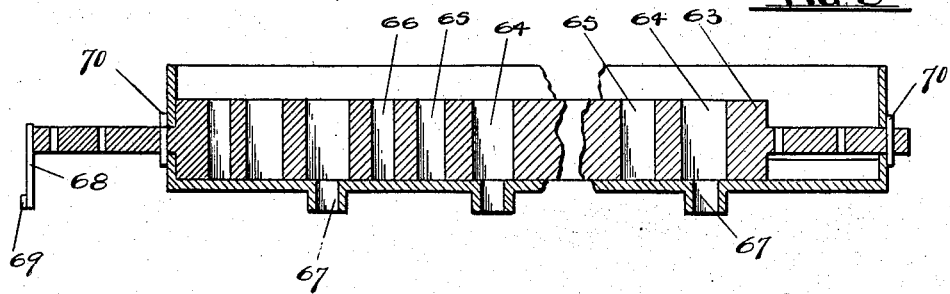
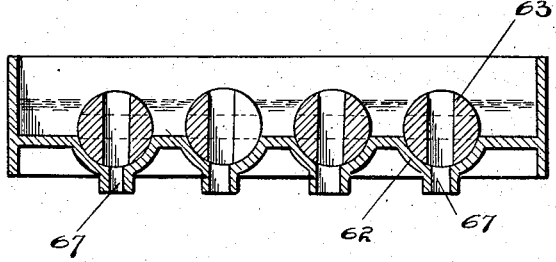

UNITED STATES PATENT OFFICE.

PATSY DONOFRIO, OF PORTLAND, OREGON, ASSIGNOR TO PERFECTION CONE MFG. CO., OF PORTLAND, OREGON, A CORPORATION OF OREGON.

DEPOSITOR.

1,216,665.  Specification of Letters Patent.  Patented Feb. 20, 1917.

Application filed May 31, 1916. Serial No. 100,958.

*To all whom it may concern:*

Be it known that I, PATSY DONOFRIO, a citizen of the United States, residing at Portland, county of Multnomah, State of Oregon, have invented certain new and useful Improvements in Depositors, of which the following is a specification.

My invention relates to depositors in general, and particularly to that class of such devices known as dough depositors, and used to distribute and deposit dough to the forms of baking machines, as ice cream cone machines and the like.

A great objection to such devices heretofore has been the open dough receptacle, subject to receiving deposits of dust, soot and insects during the operation of the machine.

The objects of my invention are to overcome the above objection by providing an entirely inclosed receptacle, and also to provide means for measuring each charge of dough deposited within the baking forms and means for adjusting said measuring means to compensate for the differences arising from the various consistencies of different batches of dough and the various ingredients used in mixing the dough.

I attain the above objects by means of the construction illustrated in the accompanying drawings, which therefore are a part of this application for Letters Patent, and in which;—

Fig. 4 is a sectional plan upon line 4—4 of Fig. 1.

Fig. 5 is a side elevation of Fig. 4, the operating rack being shown in section.

Fig. 6 is a sectional plan view similar to Fig. 4, illustrating a modified construction of the operating means.

Fig. 7 is a perspective view of a portion of a dough depositor of modified construction embodying the principles of my invention.

Fig. 8 is a longitudinal section on line 8—8 of Fig. 7.

Fig. 9 is a transverse section on line 9—9 of Fig. 7.

Like characters of reference indicate like parts throughout the several views of the drawings.

Figure 2:
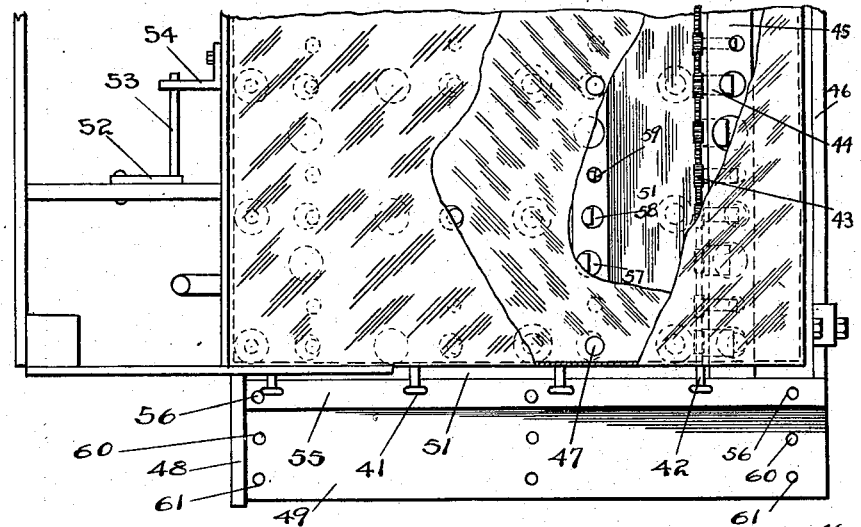
Fig. 2 is a plan view of the subject matter of Fig. 1, parts being broken away to illustrate the construction.
Figure 1:
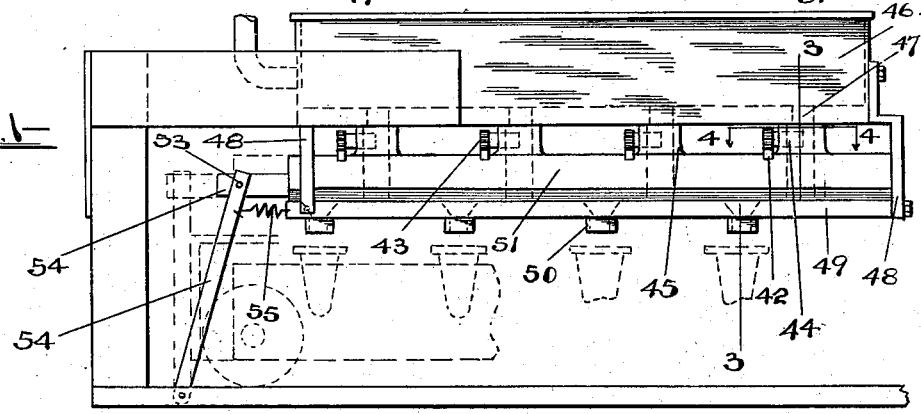
Figure 1 is a side elevation of a dough depositor embodying my invention, shown as operated in conjunction with the reciprocating carriage of an ice cream cone baking machine of the type covered in my application for Letters Patent filed Sept. 7, 1915, Serial No. 49307, for pastry baking machines.
Figure 3:
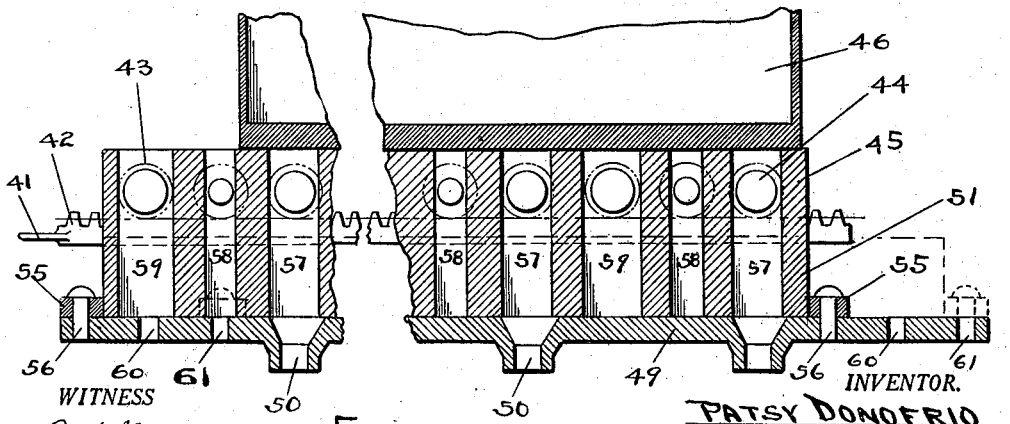
Fig. 3 is a transverse sectional elevation upon line 3—3 of Fig. 1, shown upon an enlarged scale.

The dough depositor may be operated independently of the baking machine it serves, but it may also be operated by means of the motion of the carriage, and such means is illustrated in Figs. 1, 2 and 3.

It is also obvious that means must be employed to govern the discharge of dough to adapt it to the size of cones being baked, and such means is also illustrated in Figs. 1, 2 and 3.

Furthermore, after the depositor has been set to regulate the discharge of dough corresponding to the size of cones being baked, a still further adjustment is required to compensate for the irregularities caused by the dough varying in consistency from time to time; a variation in the ingredients used (as the brand or type of flour) also requires a method of minute adjustment without disturbing the setting of the device as regards the size of cones being baked, and a means of effecting such an adjustment is illustrated in Figs. 1, 2, 3, 4, 5 and 6.

The dough pan is a rectangular box 46, having ports 47 in the bottom thereof, there being as many such ports as there are baking forms upon the carriage of the baking machine being served.

Beneath the dough pan, and suspended therefrom by straps 48 is a plate 49 having depending therefrom nozzles 50 adapted to register with the female forms when the carriage is brought to rest beneath the dough pan, as shown in Fig. 1.

Intermediate the bottom of said dough pan and said plate 49 is a valve member 51 provided with several series of ports, there being a series of ports for each size of cone manufactured, and the ports of each series being of sufficient size to hold just enough dough to make a cone.

The ports 47 in the bottom of the dough pan and the nozzles 50 in the plate 49 are offset relatively in the direction of motion of slide valve 51, so that when said slide valve is at one end of its stroke the ports of the same will register with ports 47 and thus be filled with dough, and when slide valve 51 is at the opposite end of its stroke, the ports therein will register with nozzles 50 and thus discharge the dough into the female baking forms beneath.

To effect the motion of slide valve 51 there is provided a lever 52 pivotally mounted at its lower end, and having at its upper end a pin 53 engaged by a clip 54 secured to the slide valve.

When the carriage contacts with the lever 52 the slide valve is moved to bring the ports therein into register with nozzles 50 and thus discharge dough into the female forms beneath, and when the carriage moves away from the dough pan spring 55 returns the slide valve to its initial position, wherein the ports in said slide valve register with ports 47 in the bottom of the dough pan, and thus the slide valve receives another charge of dough.

The motion of the slide valve may be said, for purposes of description, to be longitudinal relative to the baking machine it serves.

When it is desired to change the size of cones being manufactured the slide valve is moved transversely, or in a direction normal to its reciprocatory motion, until another series of slide valve ports is brought into line with ports 47 and nozzles 50, said series of ports being such as will deliver the required amount of dough for the desired size of cones.

To accomplish the transverse movement of the slide valve for the purpose of changing the series of ports in use, and also to confine said slide valve to the proper path for its reciprocatory motion, guides 55 are provided upon each side of plate 49 to which said guides are secured by dowels 56, and between which guides the slide valve 51 is confined and slides.

As illustrated in Figs. 1, 2 and 3, there are three series of ports in slide valve 51, designated as 57, 58 and 59, and Fig. 3 shows the slide valve and guides 55 adjusted to use ports 57.

If it were desired to use ports 58 the guides would be shifted so that dowels 56 would be placed in holes 60, while if the use of ports 59 were desired the guides would be shifted so that the dowels 56 would be placed in holes 61.

The mechanism previously described for producing the reciprocation of slide valve 51 will operate for any position of the slide valve and the guides 55.

The ports in valve 51 are extended above the upper surface thereof by means of lugs or ridges 45 thereon, each lug extending transversely entirely across the valve 51, as shown in Fig. 2.

An orifice is opened through said lug into each of said ports 57, 58 and 59, and a screw plug 44 is inserted into each of said orifices, as shown in detail in Figs. 4 and 5.

By screwing said plugs into or out of said ports the dough contained therein is regulated in amount.

As a means for rapidly and simultaneously adjusting the plugs 44 in each line, each of said plugs is provided with a gear 43 integrally mounted thereon and adapted to mesh with a rack 42 adjacent thereto.

Each of said racks operates in a groove or guideway transversely disposed upon the upper face of valve 51 immediately adjacent to and parallel with one of said lugs 45, as shown in Figs. 1, 2, 4 and 5.

A handle 41 is provided upon each rack 42 whereby said rack may be reciprocated transversely of valve 51, thereby through the means of gears 43 operating to screw the plugs 44 into or out of their respective ports, thereby regulating the amount of dough to be contained in each of said ports.

A modified form of operating the adjusting plugs is illustrated in Fig. 6, wherein the plugs are not screwed into their respective ports, but are fitted into said ports reciprocatingly, each line of said plugs being inter-connected by a rod 40 passing through stems 39 upon the plugs.

Upon each end of each of said rods 40 is mounted one end of a reach rod 38, the opposite ends of said reach rods being pivotally connected by means of a bar 37.

Said bar 37 is connected to a hand lever 36 by means of a link 35, and said hand lever is fulcrumed upon a bracket 34 secured to any convenient member of the frame work.

A reciprocating motion imparted to hand lever 36 imparts (by means of link 35, bar 37, reach rods 38 and rod 40) a reciprocating motion to each of the plugs.

A similar system of parts is provided for each of rods 40, each system lying in a horizontal plane immediately above or below the adjacent system.

A modified construction of dough pan is presented in Figs. 7, 8 and 9, in which the bottom of the dough pan has corrugations 62 in which are revolubly mounted cylinders 63, each cylinder having several series of ports of various sizes, as 64, 65 and 66, adapted to register with ports 67 in the dough pan bottom.

Levers 68 are secured to each cylinder, and a link 69 connects all said levers to operate same simultaneously.

As the cylinders are turned so that the ports therein lie beneath the level of the dough, as shown in dotted lines in Fig. 9, the ports will be filled, and as the cylinders are again turned into the position shown in full lines in Fig. 9 so that the upper ends of the ports therein are above the level of the dough and said ports register with ports 67, the dough contained in the cylinder ports will be discharged through ports 67 into the female forms below.

The cylinders 63 may be moved longitudinally within the dough pan for the purpose of bringing either series of ports 64, 65 or 66 into register with ports 67, and secured in the desired position by means of pins 70.

My invention may be made of any size, and constructed of any materials deemed convenient and suitable in a device of this character, and while I have illustrated and described a preferred form of construction and arrangement of parts found desirable in materializing my invention, I wish to include in this application for Letters Patent all mechanical equivalents or substitutes that may fairly be considered to come within the scope and purview of my invention as defined in the appended claims.

Having disclosed my invention, what I claim is:—

1. A dough depositor comprising a reservoir to contain dough having a plurality of symmetrically disposed ports in the bottom thereof; a valve adapted to coact with said ports, and having therein a plurality of series of ports, the ports in each of said series being symmetrically disposed correspondingly to said ports in the bottom of said reservoir, and the ports in each of said series being of a size varying from that of the ports in each of the other series; means to shift the valve so that any series of ports therein may coact with the ports in the bottom of said reservoir; and means for reciprocating said valve so that the ports in one of said series therein may periodically open and close the ports in the bottom of said reservoir.

2. A dough depositor comprising a reservoir having a plurality of symmetrically disposed ports therein; a valve having a plural series of receptacles therein, the receptacles in each of said series being symmetrically disposed correspondingly to said ports, and the receptacles in each of said series being of a size varying from those in each of the other series; means for setting the valve so that the receptacles in any one of said series may be filled with dough from said reservoir; and operable means for periodically filling said receptacles from said reservoir.

In witness that I claim the foregoing as my own I hereunto affix my signature in the presence of two subscribing witnesses, at Portland, county of Multnomah, State of Oregon, this 8 day of May, 1916.

PATSY DONOFRIO.

Witnesses:
C. F. BLAKE,
C. S. BROWN.

Copies of this patent may be obtained for five cents each, by addressing the "Commissioner of Patents, Washington, D. C."